US008048963B2

(12) United States Patent
Fuller et al.

(10) Patent No.: US 8,048,963 B2
(45) Date of Patent: Nov. 1, 2011

(54) ION EXCHANGE MEMBRANE HAVING LAMELLAR MORPHOLOGY AND PROCESS OF MAKING THE SAME

(75) Inventors: Timothy J. Fuller, Pittsford, NY (US); Sean M MacKinnon, Fairport, NY (US); Michael R. Schoeneweiss, W. Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 137 days.

(21) Appl. No.: 12/551,272

(22) Filed: Aug. 31, 2009

(65) Prior Publication Data
US 2011/0054050 A1    Mar. 3, 2011

(51) Int. Cl.
*C08F 114/18* (2006.01)

(52) U.S. Cl. ....... 525/326.2; 521/27; 526/250; 526/252; 526/253; 526/254

(58) Field of Classification Search ............... 525/326.2; 526/250, 252, 253, 254; 521/27
See application file for complete search history.

(56) References Cited

U.S. PATENT DOCUMENTS

| | | | |
|---|---|---|---|
| 5,006,408 A * | 4/1991 | Green et al. ................. | 428/395 |
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1* | 1/2008 | Maier et al. ..................... | 521/25 |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.
Smith, D.W. et al, "Perfluorocyclobutane (PFCB) polyaryl ethers: versatile coatings material," J. of Fluorine Chem., v. 104, pp. 109-117 (2000).
Souzy, R. et al "Functional fluoropolymers for fuel cell membranes," Solid State Ionics, v. 176, pp. 2839-2848 (2005).
Souzy, R. et al., "Functional fluoropolymers for fuel cell membranes," Prog. Polm. Sci. 30, 2005, pp. 644-687.
Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).
Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.
"Fluorel Technical Data Sheets," MatWeb Material Property Data website, http://www.matweb.com/search/GetMatIsByTradename.aspx?navletter=F&tn=Fluorel%E2%84%A2, copyright 1996, 1 pg.
Nafion perfluorinated resin, Sigma-Aldrich Online Catalog, http://www.sigmaaldrich.com/catalog/ProductDetail.do?lang=en&N4=495786|ALDRICH&N5=SEARCH_CONCAT_PNO|BRAND_KEY&F=SPEC, copyright 2010, 1 pg.

* cited by examiner

*Primary Examiner* — Bernard Lipman
(74) *Attorney, Agent, or Firm* — Brooks Kushman P.C.

(57) ABSTRACT

An ion exchange membrane is prepared from a block copolymer comprising a hydrophobic polymer segment and a polar polymer segment. The ion exchange membrane is formed by placing a film layer in steam, water or an electric field at a temperature greater than about 40° C. for sufficient amount of time to develop a bicontinuous morphology. The ion exchange membrane is also formed from a film layer comprising a block copolymer and a solvent. The film layer is placed in an electric field at an elevated temperature and dried therein. The film layer is thereby converted into an ion exchange membrane with bicontinuous morphology. The ion exchange membrane prepared according to these processes exhibits improved mechanical and electrochemical properties.

21 Claims, 5 Drawing Sheets

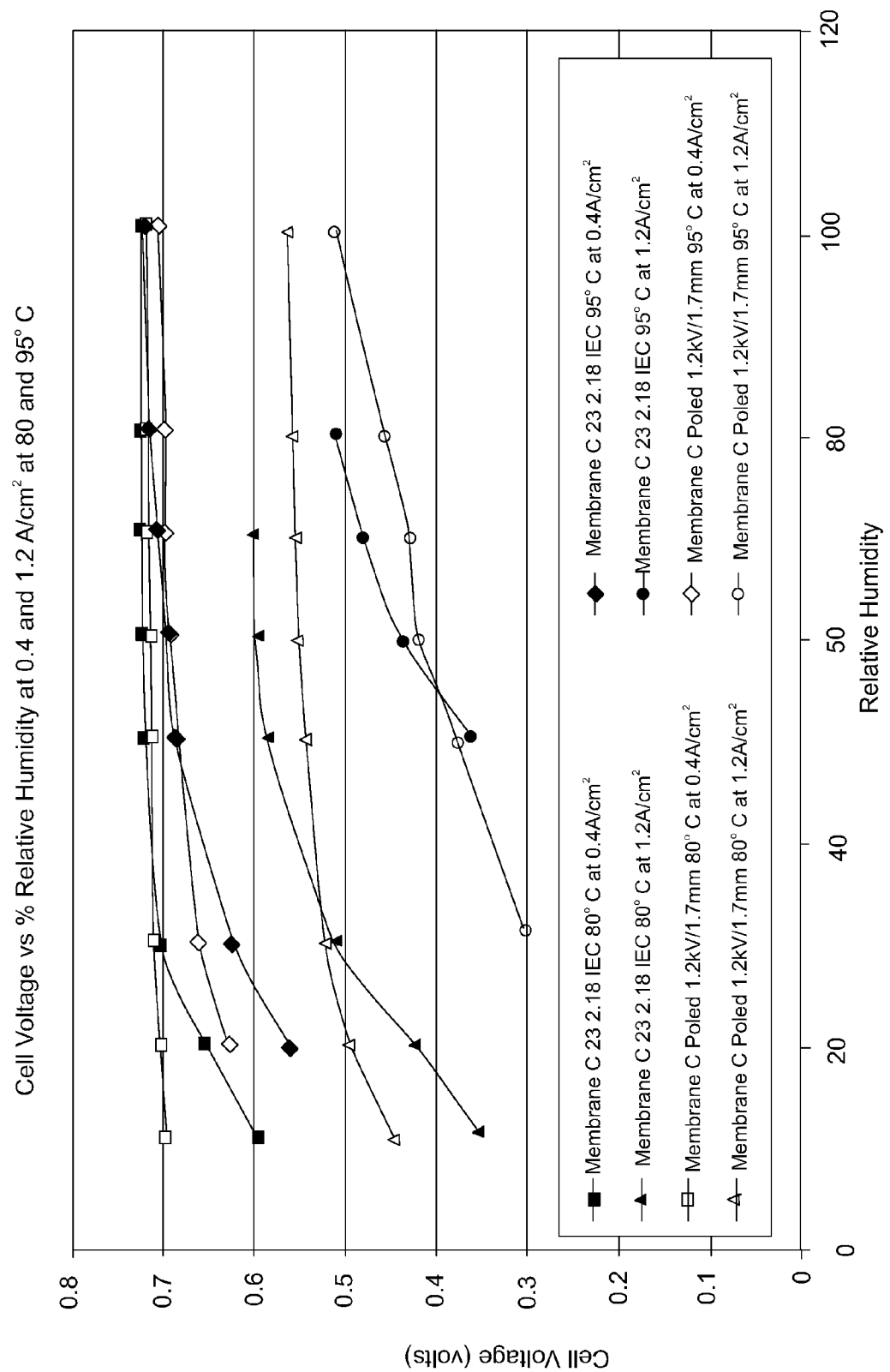

ION EXCHANGE MEMBRANE HAVING LAMELLAR MORPHOLOGY AND PROCESS OF MAKING THE SAME

TECHNICAL FIELD

The present invention relates to fuel cell ion exchange membranes and to fuel cell membrane electrode assemblies including such membranes.

BACKGROUND

Proton conductive polymers, such as the sulfonated fluoropolymer NAFION®, have been used as solid ion exchange membrane materials in fuel cells. Although such membrane materials work reasonably well, demanding fuel cell applications, such as automotive fuel cells, require significant improvements. In such fuel cell applications, fuel cells require a large current density in a wide range of operating conditions for a long product life cycle. The membrane in those fuel cells must have high proton conductivity and minimal dimension change in a wide range of humidity and temperatures. Many random copolymers may provide high proton conductivity if sufficient hydration level and high ion exchange capacity are achieved. At high hydration level and high relative humidity, however, excessive membrane swelling cannot be avoided with random copolymers. It is difficult for random copolymers to provide high proton conductivity and excellent mechanical stability simultaneously under a wide range of fuel cell operating conditions. Certain types of block copolymers have been disclosed as improvement over random copolymers due to their ability to form different morphologies with interconnected hydrophobic domains and proton conductive domains. It is conceivable that some of the block copolymers might provide both high proton conductivity and mechanical stability in a wide range of fuel cell operation conditions. When a block copolymer is processed into a membrane, however, the block copolymer doesn't spontaneously form the most desirable morphology to afford the membrane properties required for optimal fuel cell operation. Besides, the most desirable morphology has not been taught or disclosed.

Accordingly, there is a need for improved methods of making ion conducting membranes.

SUMMARY OF EXEMPLARY EMBODIMENTS OF THE INVENTION

The present invention solves one or more problems of the prior art by providing in at least one embodiment a process of making an ion exchange membrane. The process of this embodiment comprises providing a block copolymer comprising a hydrophobic polymer segment and a polar polymer segment from which a membrane is formed. The membrane is subsequently placed in steam, water or an electric field at a temperature greater than about 40° C. for a sufficient amount of time to develop hydrophilic and hydrophobic domains morphology consistent with a two phase bicontinuous morphology, including disorder and/or ordered morphologies. Another embodiment of the invention includes a process of making an ion exchange membrane. The method of this embodiment includes providing a block copolymer comprising a hydrophobic polymer segment and a polar polymer segment, which is dissolved or dispersed in solvent to form a resin mixture. The resin mixture is formed into a film layer which is subsequently placed between two electrodes. The film is then heated to a temperature above about 40° C. An electric field is applied to the film layer by applying an electrical potential difference between the electrodes. At least a portion of the solvent is removed from the film layer.

In still another embodiment, an ion exchange membrane made from the above processes is provided. Such ion exchange membranes exhibit bicontinuous morphology, and in particular, lamellar morphology, high proton conductivity and good mechanical stability under a wide range of fuel cell operating conditions.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 5 provides fuel cell test results comparing solution-coated membrane C, dried in an electric field of 1.2 kilo-v/1.7 mm electrode gap at 80° C., with those of membrane A, coated and dried in the absence of an electric field

DETAILED DESCRIPTION OF EXEMPLARY EMBODIMENTS

Figure 1:
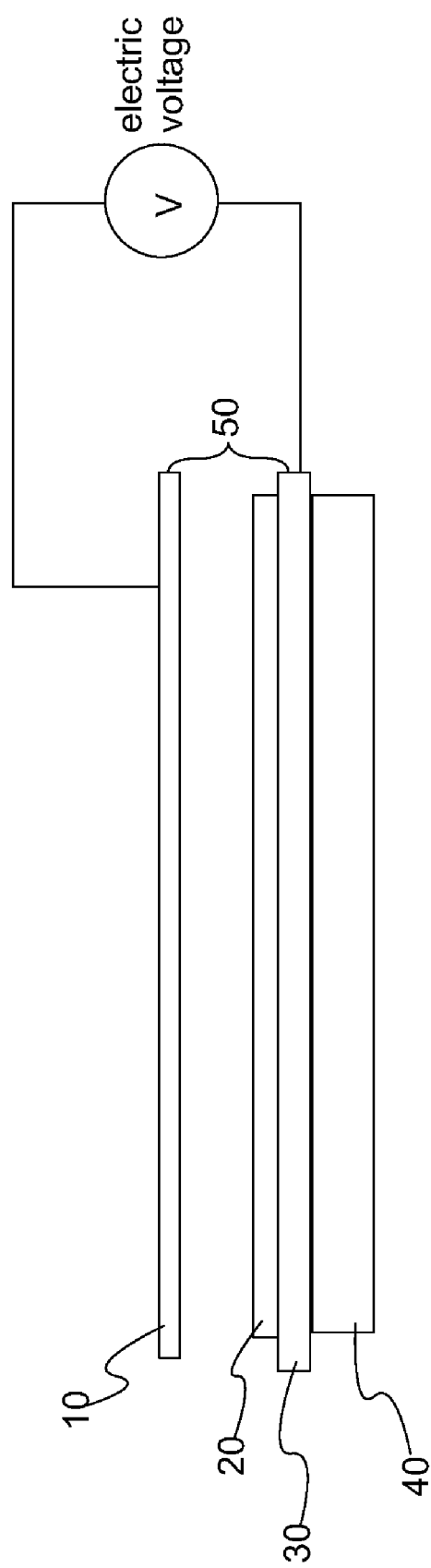
FIG. 1 is a schematic drawing of a system of treating a film layer of a block copolymer in an electric field at an elevated temperature.

The following description of the embodiment(s) is merely exemplary in nature and is in no way intended to limit the invention, its application, or uses.

In one embodiment of the present invention, a process of making an ion exchange membrane with improved electrochemical and mechanical properties is provided. The method of the present embodiment comprises:

(a) providing a block copolymer comprising a hydrophobic polymer segment and a polar polymer segment;

(b) forming a membrane comprising the block copolymer; and (c) placing the membrane in steam, water or an electric field at a temperature greater than about 40° C. for a sufficient amount of time to develop a bicontinuous morphology. Typically, at least part of the solvent is removed during step c). As used herein, a polar polymer segment may be an ionic polymer segment (i.e., has ionic substituents) or a hydrophilic polymer segment (i.e., has hydrophilic substituents).

In another embodiment of the present invention, a process of making an ion exchange membrane with improved electrochemical and mechanical properties is provided. The method of the present embodiment comprises:

(a) providing a block copolymer comprising a hydrophobic polymer segment and a polar polymer segment;

(b) dissolving or dispersing the block copolymer in a solvent to form a resin mixture;

(c) forming a film layer from the resin mixture;

(d) placing the film layer between two typically planar electrodes;

(e) heating the film layer to a temperature above about 40° C.;

(f) applying a voltage across said planar electrodes; and (g) removing at least part of the solvent in the film layer.

The block copolymer utilized in the embodiments set forth above comprises at least one hydrophobic polymer segment and one ionic polymer segment. The ionic polymer segment comprises ionic chemical moieties capable of engaging in ion exchange to provide ionic conductivity. The hydrophobic polymer segment is typically free of ionic moieties. Any process capable of making a block polymer with the requisite hydrophobic and hydrophilic segments may be utilized. The block copolymer can be prepared by addition polymerization, condensation polymerization, ring opening polymerization, Ziegler-Natta polymerization, metallocene catalyzed polymerization, thermal cycloaddition polymerization, catalyzed nickel or palladium coupling of haloaromatics, nitroxyl-mediated radical polymerization, RAFT (reversible addition fragmentation transfer) polymerization, ATRP polymerization, copper (Ullmann) coupling, copper salt mediated polymerization, anionic polymerization, photopolymerization, and plasma polymerization. In variations of the invention, the block copolymer includes a polymer configuration of diblock, triblock, multiblock, branch, comb, star, dendrimer, and the like. In one variation, the hydrophobic polymer segment and the ionic polymer segment are capable of segregating into at least two different domains—a hydrophobic domain and a polar domain. The hydrophobic domain provides good mechanical properties and resistance to swelling in water or high relative humidity environment. The ionic domain provides ion exchange capability and ionic conductivity. The ionic group in the ionic polymer segment may include, for example, sulfonic acid, chlorosulfonate, fluorosulfonate, sulfonamide, sulfonimide, carboxylic acid, phosphoric acid, phosphonic acid, and various metal salts thereof. For a hydrogen fuel cell, the ionic group may be a sulfonic acid group for desired proton conductivity in the electrode membrane.

The hydrophobic polymer segment may include, for example, monomer units of aromatic, aliphatic, silicone, phosphazene, fluorinated hydrocarbon, and the like. Fluorocarbon based polymer segment and aromatic polymer segment may be selected to provide good thermal and chemical resistance for automotive fuel cells with long service life. Non-limiting examples of hydrophobic polymer segment may include polytetrafluoroethylene, polyvinylidene difluoride, perfluorinated polyethylene oxide, perfluorinated polypropylene oxide, polyperfluorocyclobutane ethers, aromatic polyethers (such as polyetherketones, polyethersulfones, polyetherimide, and polyphenylene oxides), polycarbonates, polysulfones, polyamides, silicones, and any derivatives thereof.

The ionic polymer segment may include, for example, segments of polyacrylic acid, polymethacrylic acid, polymaleic acid, sulfonated polystyrene, sulfonated aromatic polyethers, sulfonated polyimides, sulfonated polyamide, sulfonated polyperfluorocyclobutane ethers, sulfonated polyarylene ether sulfones, sulfonated polyarylene ether ketones, and any derivatives thereof. The ionic polymer segment may also include the phosphonic acid substituted derivatives of the classes of polymers listed above.

Ion exchange block copolymers may be synthesized by copolymerizing the corresponding monomers of the hydrophobic polymer segment and the ionic polymer segment. Living anionic polymerization, living free radical polymerization, thermal cycloaddition polymerization, condensation polymerization, atom transfer polymerization, and group transfer polymerization may be used to prepare the block copolymer. The block copolymer can also be prepared by copolymerizing at least two monomers to form an intermediate block copolymer, followed by selective sulfonation of one of the intermediate polymer segments. Several examples of ion exchange block copolymers are described in U.S. Pat. No. 6,761,989, which is incorporated herein by reference in its entirety. Trifluorovinyl ether monomers, for example, are also suitable for making ion exchange block copolymers.

The block copolymer may be processed into a membrane through any processes known to one of ordinary skill in the art. In one embodiment, the block copolymer may be dissolved or dispersed in a solvent to form a resin solution or liquid resin mixture. Various additives may be included in the resin mixtures. Examples of additives include heat and chemical stabilizers, colorants, crosslinking agents, metal catalysts, metal oxides (ceria, manganese dioxide, polyvinyl alcohol-vinyl acetate, metal ions of cerium and manganese), corrosion inhibitors, inorganic acids and salts.

In another variation, a second polymer is added to the block copolymer comprising a hydrophobic polymer segment and a polar polymer segment. In one refinement, the second polymer is a non-ionic polymer (e.g., polyvinylidene difluoride and other elastomers). The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic groups. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex® and Solvay Solexis under the trade name Technoflon®, from 3M under the trade name Dyneon®, and from DuPont under the trade name Viton®. For example, Kynar Flex 2751 is a useful copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after being blended with a first polymer that includes a perfluorocyclobutyl moiety.

A film layer may be formed from the resin mixture by coating, spray, transfer coating, calendering, and other film casting methods. The solvent in the film layer is subsequently removed by vacuum, convective heating, radiation heating and other heating methods. The solvent can also be removed by immersing a wet film layer into a coagulating bath, to allow solvent to leach into the coagulating solution. Examples of solvent, or mixtures of solvents, for preparing the resin mixtures include one or more of the following: water, alcohols, chlorinated hydrocarbon, chlorinated aromatics, fluorocarbon, chlorofluorocarbon, ketones, dimethyl foramide, dimethyl acetamide, N-methyl pryrolidinone, dimethylsulfoxide, toluene, ethers and the like.

In a variation, the block copolymer includes cyclobutyl moiety. Suitable polymers having cyclobutyl moieties are disclosed in U.S. Pat. Pub. No. 20070099054, U.S. Pat. Pub. No. 20070099054, U.S. patent application Ser. No. 12/197,530 filed Aug. 25, 2008; Ser. No. 12/197,537 filed Aug. 25, 2008; Ser. No. 12/197,545 filed Aug. 25, 2008; and Ser. No. 12/197,704 filed Aug. 25, 2008; the entire disclosures of which is hereby incorporated by reference. In another variation of the present invention, the block copolymer comprises polymer segments 1 and 2:

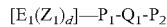       1

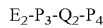       2 wherein:

$Z_1$ is a protogenic group such as —$SO_2X$, —$PO_3H_2$, —COX, and the like;

$E_1$ is an aromatic containing moiety;

$E_2$ is an unsulfonated aromatic-containing and/or aliphatic-containing moiety;

X is an —OH, a halogen, an ester, or

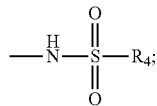

d is the number of $Z_1$ attached to $E_1$. In one refinement, d is equal to the number of aromatic rings in $E_1$. In another refinement, each aromatic ring in $E_1$ can have 0, 1, 2, 3, or 4 $Z_1$ groups;

$P_1$, $P_2$, $P_3$, $P_4$ are each independently absent, —O—, —S—, —SO—, —CO—, —$SO_2$—, —$NR_1H$—, $NR_2$—, or —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

In another variation of the present embodiment, the block copolymer comprises segments 3 and 4:

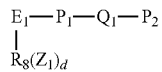       3

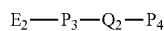       4 wherein:

$Z_1$ is a protogenic group such as —$SO_2X$, —POX, —COX, and the like;

$E_1$, $E_2$ are each independently an aromatic-containing and/or aliphatic-containing moiety;

X is an —OH, a halogen, an ester, or

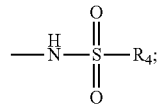

d is the number of $Z_1$ attached to $E_1$. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;

$P_1$, $P_2$, $P_3$, $P_4$ are each independently absent, —O—, —S—, —SO—, —CO—, —$SO_2$—, —NH—, $NR_2$—, or —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety and in particular a perfluorocyclobutyl moiety. In a refinement of this variation, $R^8$ is $C_{1-25}$ alkylene, $C_{1-25}$ perfluoroalkylene, perfluoroalkyl ether, alkylether, or $C_{1-25}$ arylene. In a further refinement, $R_8(Z_1)_d$ is —$CF_2$—$CF^2$—O—$CF_2$—$CF_2SO_3X$ and other derivatives, ie, $Z_1$ could also be —$CF_2$—$CF_2SO_2X$, —$CF_2$—$CF_2$—$PO_3X$, or —$CF_2$—$CF_2$—COX.

In another variation of the present embodiment, the block copolymer comprises segments 5 and 6:

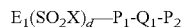       5

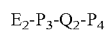       6 connected by a linking group $L_1$ to form polymer units 7 and 8

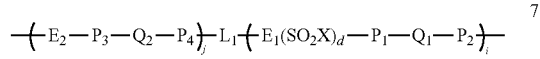       7

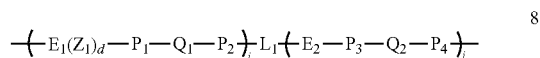       8 wherein:

$Z_1$ is a protogenic group such as —$SO_2X$, —$PO_3H_2$, —COX, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

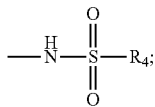

d is a number of $Z_1$ functional groups attached to $E_1$;

$P_1$, $P_2$, $P_3$, $P_4$ are each independently absent, —O—, —S—, —SO—, —SO$_2$—, —CO—, —NH—, NR$_2$—, —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 1 which is typically from 1 to 200; and j is a number representing the repetition of a polymer segment 2 which is typically from 1 to 200.

In still another variation of the present embodiment, the block copolymer comprises polymer segments 9 and 10:

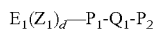     9

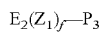     10 wherein:

$Z_1$ is a protogenic group such as —SO$_2$X, —PO$_3$H$_2$, —COX, and the like;

$E_1$, $E_2$ is an aromatic or aliphatic-containing moiety wherein at least one of $E_1$ and $E_2$ includes an aromatic substituted with $Z_1$;

X is an —OH, a halogen, an ester, or

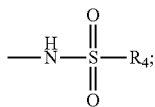

d is the number of $Z_1$ functional groups attached to $E_1$. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;

f is the number of $Z_1$ functional groups attached to $E_2$; In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average;

$P_1$, $P_2$, $P_3$ are each independently absent, —O—, —S—, —SO—, —SO$_2$—, —CO—, —NH—, NR$_2$—, —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero, d is zero.

Example for Q1 and Q2 in the above formulae are:

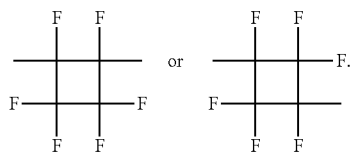

In each of the formulae 1-10, $E_1$ and $E_2$ include one or more aromatic rings. For example, $E_1$ and $E_2$, include one or more of the following moieties:

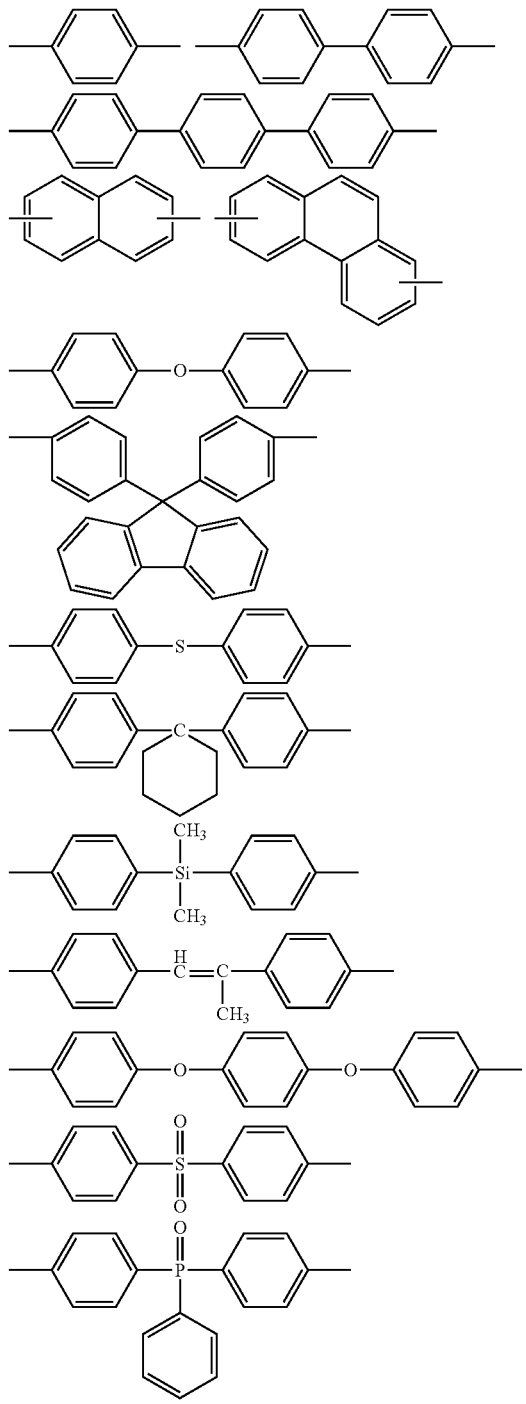

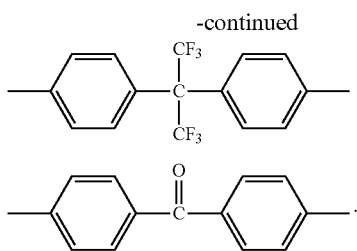

Examples of $L_1$ include the following linking groups:

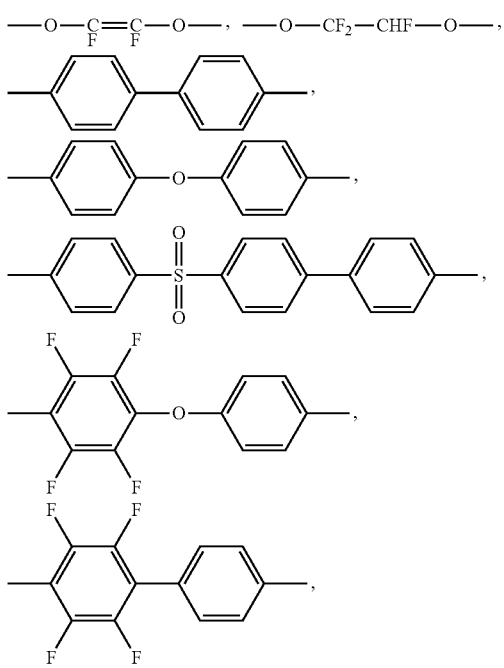

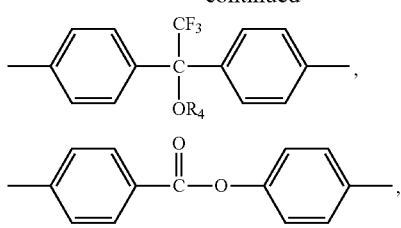

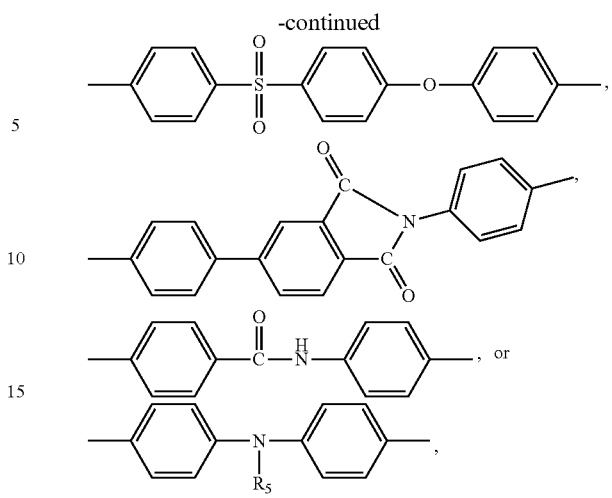

where $R_5$ is an organic group, such as an alkyl or acyl group.

In another embodiment, the block copolymer may be processed into a membrane by thermal forming processes, such as extrusion, blow molding, calendaring, and slot die coating. Membranes formed from the block copolymer in the conventional processes described above do not spontaneously form a desired morphology or an optimal segregated membrane domain structure to afford the optimal mechanical properties and ion exchange properties.

In one variation, two oligomers with trifluorovinyl reactive end groups are obtained separately through thermal cycloaddition reaction of 4,4'-bis(4-trifluorovinyloxy)bisphenyl and 2,2-bis(4-trifluorovinyloxyphenyl)1,1,1,3,3,3-hexafluoropropane under nitrogen blanket at a temperature between 140-210° C. The two oligomers are then allowed to react with each other through further cycloaddition coupling reaction to produce a block copolymer having a structure unit represented by formula 11, where x and y are positive integers. The block copolymer is further reacted with a sulfonation agent, such as chlorosulfonic acid, to form an ion exchange block copolymer represented by formula 12.

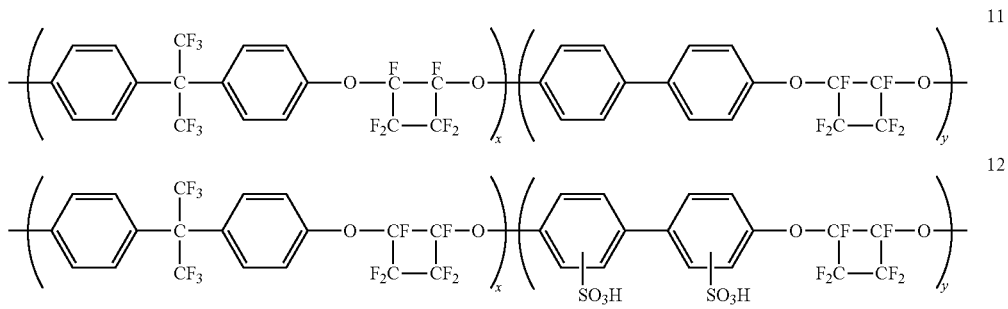

In one embodiment, an ion exchange block copolymer membrane prepared by a conventional method is placed in water, steam, and/or an electric field at a temperature greater than about 40° C. for a sufficient amount of time to cause the membrane to develop a bicontinuous morphology. Bicontinuous herein is referred to as a material structure formed as a result of segregation of hydrophobic and ionic polymer segments into different domains where at least one of the domains takes a shape of a ribbon, sheet, fiber, or cylinder. In a refinement, the bicontinuous morphology is lamellar. The morphology can include worm-like phase separations which can sometimes be disordered. The bicontinuous morphology may exhibit a band or line pattern in an electron micrograph, especially when one of the domains is selectively stained with a heavy metal ion for enhanced contrast. The bicontinuous morphology provides improved mechanical properties and ionic conductivity over a wide range of relative humidity and temperatures. Although the Applicants do not wish to be bound by or to any particular theory, it is believed that the bicontinuous morphology provides a continuous network of ionic conductive channels with high, localized concentrations of proton conducting groups embedded in a mechanically robust framework of hydrophobic domains within the membrane.

In one embodiment, the membrane is placed in water at temperatures greater than 40° C. for a sufficient amount of time to develop a bicontinuous morphology. The membrane, for example, may be immersed in boiling water for a period of time from several minutes to many hours. The membrane may also be placed in superheated water at temperature greater than 100° C. in a pressurized vessel. Certain additives may be included in the liquid water. The additives may include, for example, salt, cosolvents, and acids. The term "water" in this particular embodiment thus includes water solutions. In another embodiment, the membrane may be placed in a steam environment at elevated temperatures. The steam may include saturated steam and superheated steam.

In yet another embodiment, the membrane is placed in an electric field at elevated temperatures. The membrane, for example, can be placed between two parallel plate electrodes with a distance d and an applied voltage V between the electrodes. The electric field within the membrane can be estimated to be V/d (V divided by d). In a variation, the electric field is typically greater than around 100 Volt/mm (volt per millimeter). In another variation, the electric field is about 1 kilo-Volt/mm. In another variation, the upper limit of voltage is less than the dielectric breakdown of the drying film where electrical shorting takes place. The treatment temperature required to form a bicontinuous morphology may be below or above the glass transition temperature of the block copolymer, which depends on the amount of solvent plasticization. The glass transition temperatures of homopolymers from 4,4'-bis(4-trifluorovinyloxy)bisphenyl and 2,2-bis(4-trifluorovinyloxyphenyl)1,1,1,3,3,3-hexafluoropropane, for example, are 165° C. and 120° C. respectively. The glass transition temperature of the corresponding block copolymer as represented by formula 12 is thus greater than 120° C. A bicontinuous structure can be successfully developed by placing a membrane of the block copolymer represented by formula 12 in boiling water at about 100° C. Using a treatment temperature lower than the glass transition temperature can limit excessive water swelling and potential thermal degradation of the block copolymer. If a block copolymer exhibits more than one distinctive glass transition temperature, the temperature selected to develop the bicontinuous structure may be below at least one of the glass transition temperatures. Typically, the temperature at which the membrane is treated is below about 200° C.

In another embodiment, the block copolymer is first dissolved or dispersed in a solvent to form a resin mixture. Various additives such as catalyst, metal oxides, conductive particles, and crosslinking agents may be added to the resin mixture. A thin film layer is then made from the resin mixture by spray, coating, extrusion or other film forming methods. The thin film layer is placed in an electric field and heated to a temperature above 40° C. A membrane with a bicontinuous morphology starts to develop as the solvent evaporates and the different block copolymer segments segregate into different domains under the influence of the applied electric field. In one embodiment, the electric field is applied by placing the film layer between two parallel planar electrodes. The planar electrodes can be solid metal plates, metal meshes, porous electrically conductive sheets or other similar conductive planar structures. The film layer may be heated by radiation, convective, conductive, microwave and/or dielectric heating methods. Various solvents can be used to prepare the resin mixture. Typically, useful solvents have a low vapor pressure. Moreover, useful solvents do not pose a risk of explosion should there be arcing between the two electrodes used to apply an electric field to the membrane as it dries out. Specific examples, include, but are not limited to, water, high boiling alcohols (with high temperature flash points), dimethyl formamide, dimethyl acetamide, N-methylpyrrolidinone, dimethyl sulfoxide, and other polar aprotic solvents. The electric field may be applied across the whole membrane uniformly or in a particular pattern such as grid, dot matrix, and lines by selecting planar electrodes with corresponding structural patterns. The strength of the electric field is typically greater than about 100-volt/mm. The voltage applied between the two planar electrodes is typically greater than about 100 kiloV/1 mm of electrode separation with the membrane being dried there between. The electric field may be applied at a constant level, or at variable levels during the membrane morphology development period. An alternating voltage wave, for example, may be applied to the two electrodes to generate a corresponding variable electric field.

With reference to FIG. 1, a schematic drawing of an exemplary system of treating a film layer of a block copolymer in an electric field at an elevated temperature is provided. A film layer 20 as described above is disposed on a conductive planar electrode 30. A separate planar electrode 10 is place in a parallel manner above the film layer 20 and the planar electrode 30 with a distance represented by 50 between the electrodes. A heated platen 40 is brought in contact with the electrode 30 to control the temperature of the film layer. An electric voltage is applied between electrode 10 and electrode 30. When electrode 10 is a solid metal plate, solvent may be condensed on electrode 10 as the film layer is heated to an elevated temperature and the solvent in the film layer evaporates towards electrode 10. The condensed solvent on electrode 10 may be periodically removed by temporarily removing the electrode to wipe off the solvent. More preferably, the electrodes are heated to prevent evaporating solvent from condensing and falling back onto the drying membrane. In one example, a block copolymer comprising a structure unit represented by formula 12 was dissolved or dispersed in the solvents set forth above.

Various combinations of the embodiments described above may also be used to develop the desirable bicontinuous structure for improved mechanical and electrochemical properties. An ion exchange membrane, for example, may be prepared by first placing a film layer of a block copolymer in an electric field at an elevated temperature. The resulting membrane is further placed in boiling water for about half an hour. In another example, a membrane prepared from a block copolymer may be placed in water or an aqueous solution at an elevated temperature while an electric field or voltage is applied cross the membrane simultaneously.

An ion exchange membrane having the bicontinuous morphology can provide improved anti-freeze properties in addition to improvement in mechanical and electrochemical properties. Although the Applicants do not wish to be bound to or by any particular theory, it is believed that the ionic domains in the bicontinuous morphology provide high local concentration of ionic groups that bind strongly to absorbed moisture. Lower freezing temperature is thus obtained because of the local ionic group concentration effect of the bicontinuous morphology.

Membrane electrode assemblies can also be prepared using the block copolymers and the processes described above to afford improved mechanical and electrochemical properties. A membrane electrode assembly comprises an electrically conductive anode layer and a cathode layer each disposed on the opposing side of an ion exchange membrane prepared from the block copolymer. The anode and cathode layers may further comprise catalysts and resin binders. In a hydrogen fuel cell, the catalyst may include a noble metal, transition metal, rare earth metal and metal oxides. Platinum, for example, may be deposited on the conductive materials in the anode and cathode layers. A complete membrane electrode assembly, for example, can be placed in boiling water for a sufficient amount of time to cause the membrane layer to develop a lamellar morphology.

Figure 2:
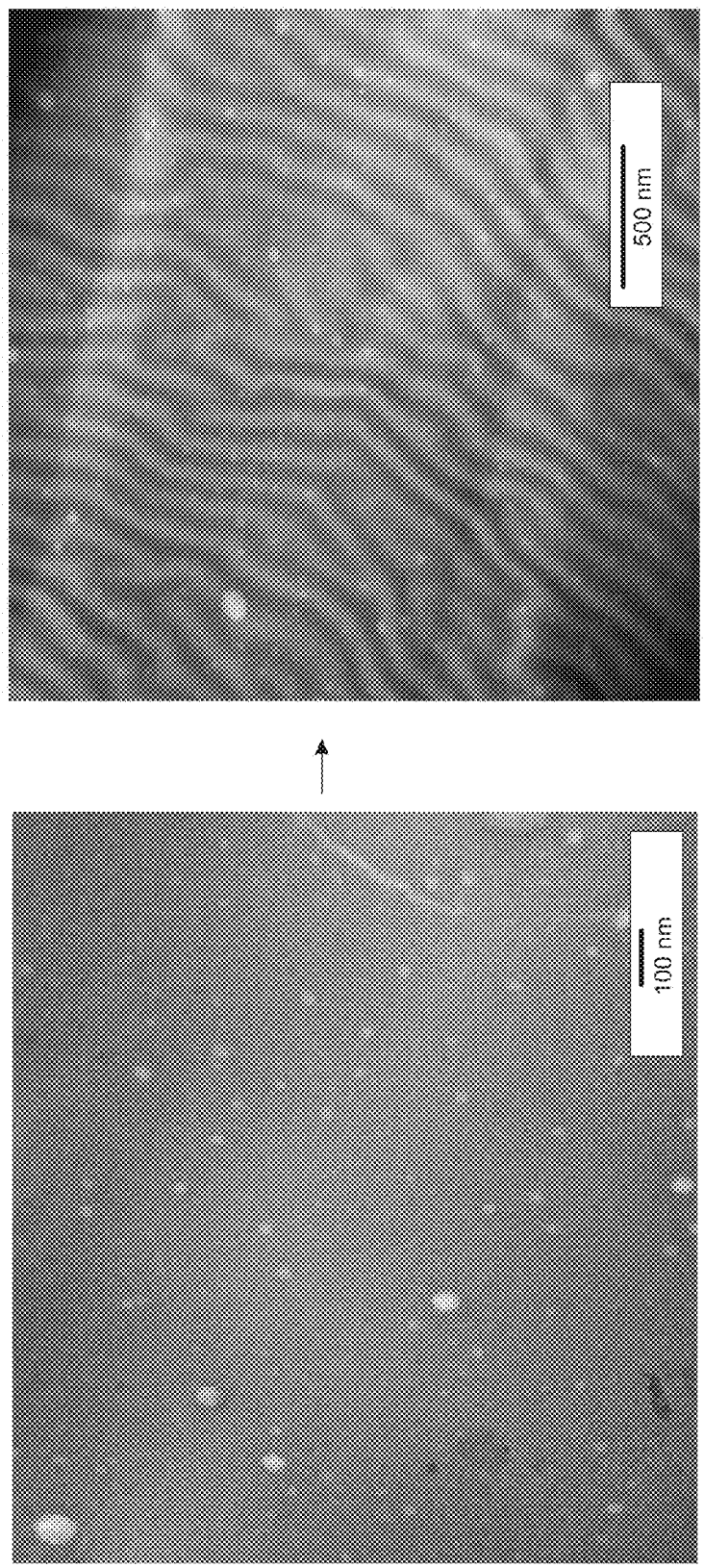
FIG. 2 shows transmission electron micrographs of two membranes (membranes A and B) from a sulfonated block copolymer.

FIG. 2 provides transmission electron micrographs of two membranes prepared from the same block copolymer. The block copolymer comprises a chemical structure represented by formula 12 as described above. Membrane A in FIG. 2 is prepared by a conventional solution-coating process. Specifically, a wet film of membrane A was solution cast onto window pane glass from N,N-dimethyl acetamide at between 17.5 and 20 wt. % polymer solids using a Bird applicator bar with a fixed gap of 8-mils or 200-microns, and then the resultant films (between 22 and 30-micrometers thick) were heated first at 80° C. until dry to the touch and then at 120° C. for 2 hours. The resultant membrane A was floated off the glass with water and then air-dried.

Membrane B was then obtained by placing membrane A in boiling water for about an hour. Membranes A and B were each treated with a heavy metal ion to selectively stain the ionic segment of the polymer for image contrast enhancement. Specifically, a piece of membrane (0.9 cm×4.5 cm×0.0025-cm) was immersed in a 1-molar solution of uranyl acetate for at least 8 hours, followed by air-drying. The dark-stained regions in the transmission electron micrograph correspond to the regions of sulfonic acid groups. As shown in FIG. 2, membrane A is substantially isotropic with no observable morphological pattern, indicating little, if any, segregation of the hydrophobic and ionic polymer segments. On the other hand, membrane B clearly exhibits a lamellar morphology characterized by the band patterns in the micrograph. Due to the formation of lamellar morphology, membrane B also exhibits improved mechanical properties as determined by a qualitative assessment of the force required to physically stretch and break the membrane when pulled apart. Membrane A and membrane B were tested individually as the proton conducting membranes in a hydrogen fuel cell at various humidity conditions. The proton conducting membranes (10 cm×10 cm) were evaluated using 50 cm²-active area, fuel cell hardware with electrodes of platinum on carbon catalyst that were coated on a microporous layers, which in turn, were coated on carbon fiber paper diffusion media. The design is designated as catalyst coated diffusion media or CCDM. Humidified gases were used: hydrogen on the anode, and air on the cathode. The cell voltages were measured versus the percent relative humidity to determine the low relative humidity performance of the films. In this test, the cell voltage was determined while the humidification levels of the anode and cathode inlets were maintained at the same percents of relative humidity. The degree of humidification was varied in stepwise multiples of 10, between 10 and 100%, inclusively, at 80 and 95° C. The cell voltages were plotted against the relative humidity when the current density was at 0.4 and 1.2 A/cm², respectively. The result is the cell voltage-r.h. sweep profile shown in FIG. 3.

Figure 3:
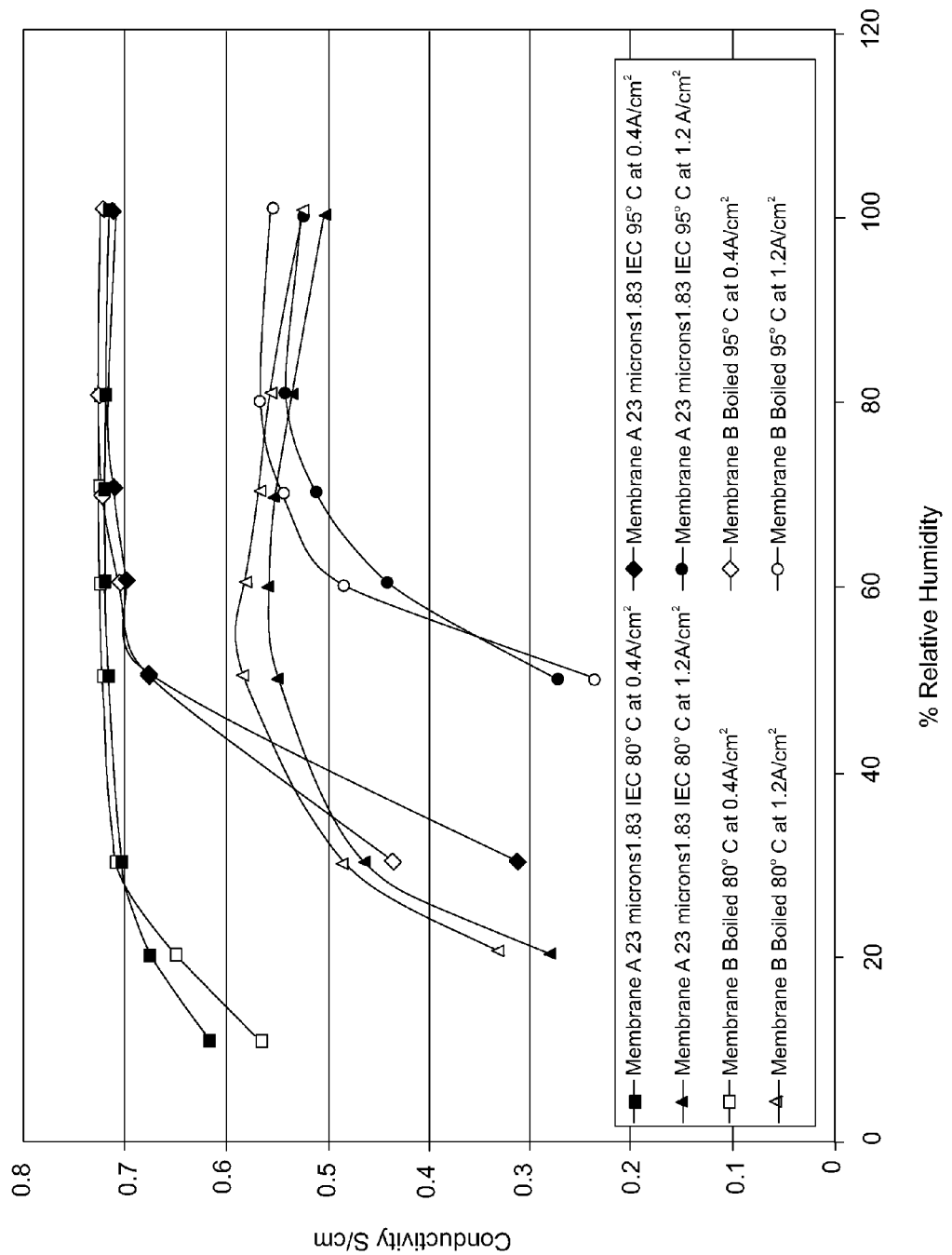
FIG. 3 provides relative humidity sweep profiles of cell voltage versus percent relative humidity for membrane A and membrane B of FIG. 1.

With reference to FIG. 3, plots of the relative humidity sweep profile of cell voltage versus percent relative humidity for membrane A and membrane B described in connection with FIG. 2 are provided. The fuel cell made with the lamellar membrane B has better performance than that made with membrane A as indicated by higher cell voltages at greater than 50% relative humidity at current densities of 0.4 and 1.2 A/cm² at 80 and 95° C., respectively. Fuel cells constructed using membrane B show higher current density and lower voltage drop compared to the fuel cell constructed from membrane A.

Figure 4:
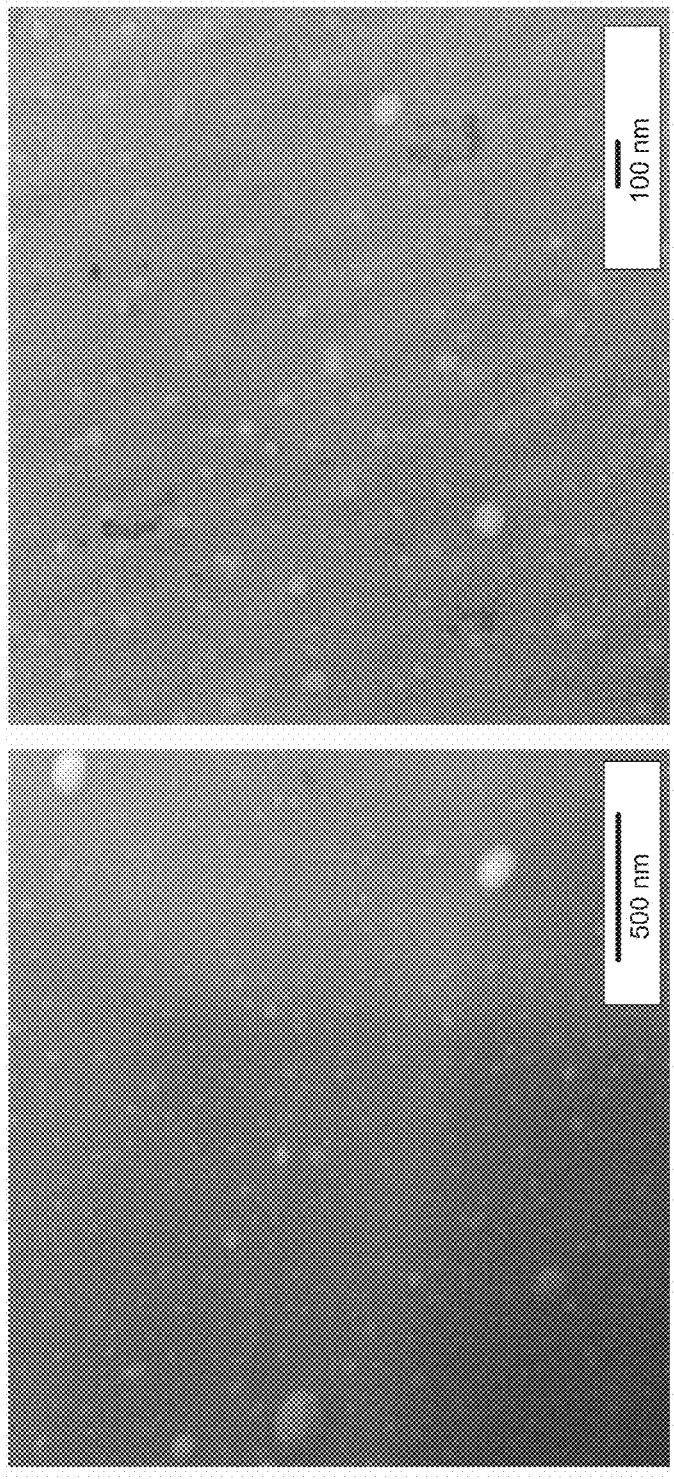
FIG. 4 provides transmission electron micrographs of isotropic, membrane A and membrane C obtained by thermally drying membrane A in an electric field.

Membrane C is prepared from a wet film as used to prepare membrane A. Specifically, a wet film of membrane A was solution cast onto window pane glass from N,N-dimethyl acetamide at 18 wt. % solids of polymer of formula 12 and a film layer was formed using a Bird applicator bar with an 8-mil gap and applying the coating on an aluminum plate electrode or onto a glass plate placed between two electrodes. Another aluminum plate as a second electrode is placed above the film layer with a spacing of about 1.3 mm between the two aluminum plate electrodes. A 1.3 kilovolt electric voltage is applied constantly across the electrodes while the heating platen is maintained at about 80° C. for about 30 minutes. Solvent condensed on the upper electrode is periodically wiped off. The electric field is subsequently turned off, and the residue solvent in the film layer is further removed by heating the film layer to about 120° C. for about 2 hours. The resulting membrane from the film layer is floated off from the aluminum electrode by immersing it in water. FIG. 4 shows an electron micrograph of the subtle onset of lamellar morphology in membrane C as a result of drying the solution coated membrane in an electric field as compared with that of membrane A that was dried in the absence of an electric field.

Membrane A and membrane C were tested individually as the proton conducting membrane in a hydrogen fuel cell at various humidity conditions as previously described. The degree of humidification was varied stepwise in multiples of 10, between 10 and 100%, inclusively, at 80 and 95° C. The cell voltages were recorded when the current density was at 0.4 and 1.2 A/cm², respectively. The result is the cell voltage-r.h. sweep profile shown in FIG. 5.

The open circuit voltage (OCV) of fuel cells incorporating the membrane examples set forth above were measured before and after the fuel cells were operated at 0.8 volts and 95° C., 50% relative humidity (both anode and cathode inlets) for 150 hours before the test was terminated. A fuel cell constructed from membrane B has significantly smaller OCV drop than fuel cells constructed from membrane A (80 micro-volts/hour for membrane B versus 140 micro-volts/hour for membrane A), indicating that the lamellar morphology of membrane B provides improved durability and electrochemical and mechanical stability. A somewhat subtle and disoriented lamellar morphology is evident in this membrane C as compared to the isotropic morphology of membrane A prepared by a conventional process.

The above description of embodiments of the invention is merely exemplary in nature and, thus, variations thereof are not to be regarded as a departure from the spirit and scope of the invention.

What is claimed is:

1. A method of making an ion exchange membrane comprising:
   a) providing a block copolymer comprising a hydrophobic polymer segment and a polar polymer segment wherein said block copolymer comprises a cyclobutyl moeity;
   b) forming a membrane comprising said block copolymer and a solvent; and
   c) placing said membrane in steam, water or an electric field at a temperature greater than about 40° C. for a sufficient amount of time to develop a bicontinuous morphology.

2. The method of claim 1 wherein said polar polymer segment is an ionic polymer segment comprising a sulfonic acid group.

3. The method of claim 1 wherein the block copolymer comprises polymer segments 1 and 2:

$$[E_1(Z_1)_d]\text{—}P_1\text{-}Q_1\text{-}P_2 \qquad 1$$

$$E_2\text{-}P_3\text{-}Q_2\text{-}P_4 \qquad 2$$

wherein:

$Z_1$ is a protogenic group;

$E_1$ is an aromatic-containing moiety;

$E_1$ is an aromatic-containing moiety;

$E_2$ is an unsulfonated aromatic-containing and/or aliphatic-containing moiety;

X is an —OH, a halogen, an ester, or

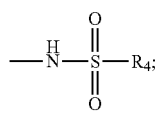

d is 0, 1, 2, 3, or 4;

$P_1$, $P_2$, $P_3$, $P_4$ are each independently absent, —O—, —S—, —SO—, —CO—, —SO$_2$—, —NR$_1$H—, NR$_2$—, or —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

4. The method of claim 1 wherein the block copolymer includes polymer segments 3 and 4:

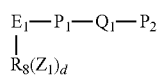

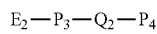

wherein:

$Z_1$ is a protogenic group;

$E_1$, $E_2$ are each independently an aromatic-containing and/or aliphatic-containing moiety;

X is an —OH, a halogen, an ester, or

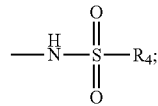

d is 0, 1, 2, 3, or 4;

$P_1$, $P_2$, $P_3$, $P_4$ are each independently: absent, —O—, —S—, —SO—, —CO—, —SO$_2$—, —NH—, NR$_2$—, or —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

5. The method of claim 1 wherein the block copolymer comprises polymer segments 5 and 6:

$$E_1(SO_2X)_d\text{—}P_1\text{-}Q_1\text{-}P_2 \qquad 5$$

$$E_2\text{-}P_3\text{-}Q_2\text{-}P_4 \qquad 6$$

connected by a linking group $L_1$ to form polymer units 7 and 8:

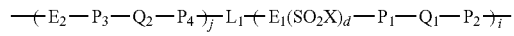

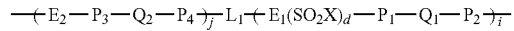

wherein:

$Z_1$ is a protogenic group;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

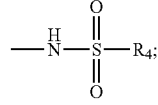

d is 0, 1, 2, 3, or 4;

$P_1$, $P_2$, $P_3$, $P_4$ are each independently absent, —O—, —S—, —SO—, —SO$_2$—, —CO—, —NH—, NR$_2$—, —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing repetition of polymer segment 5; and j is a number representing repetition of polymer segment 6.

6. The method of claim 1 wherein the block copolymer includes polymer segments 9 and 10:

$$E_1(Z_1)_d\text{—}P_1\text{-}Q_1\text{-}P_2 \qquad 9$$

$$E_2(Z_1)_f\text{-}P_3 \qquad 10$$

wherein:
$Z_1$ is a protogenic group;
$E_1$, $E_2$ is an aromatic or aliphatic-containing moiety wherein at least one of $E_1$ and $E_2$ includes an aromatic substituted with $Z_1$;
X is an —OH, a halogen, an ester, or

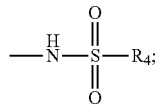

d is 0, 1, 2, 3, or 4;
f is 0, 1, 2, 3, or 4;
$P_1$, $P_2$, $P_3$ are each independently absent, —O—, —S—, —O—, —SO$_2$—, —CO—, —NH—, —NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero, d is zero.

7. The method of claim 1 wherein said temperature is below 200° C. or a glass transition temperature of said block copolymer.

8. The method of claim 1, wherein at step c, said membrane is placed in boiling water at a temperature of about 100° C.

9. The method of claim 1, wherein said electric field is at least 100 V/mm.

10. The method of claim 1 wherein a second polymer is provided along with the block copolymer is provided.

11. The method of claim 10 wherein the second polymer is a non-ionic polymer.

12. A method of making an ion exchange membrane comprising:
a) providing a block copolymer comprising a hydrophobic polymer segment and a polar polymer segment wherein said block copolymer comprises a hydrophobic perfluorocyclobutane ether polymer segment and a sulfonated hydrophilic perfluorocyclobutane ether polymer segment;
b) dissolving or dispersing said block copolymer in a solvent to form a resin mixture;
c) forming a film layer from said resin mixture;
d) placing said film layer between 2 planar electrodes;
e) heating said film layer to a temperature above about 40° C.;
f) applying a voltage across said planar electrodes; and
g) removing at least part of the solvent in the film layer.

13. The method of claim 12 wherein said polar polymer segment comprises a sulfonic acid group.

14. The method of claim 12 wherein the block copolymer comprises polymer segments 1 and 2:

$$[E_1(Z_1)_d]\text{—}P_1\text{-}Q_1\text{-}P_2 \qquad 1$$

$$E_2\text{-}P_3\text{-}Q_2\text{-}P_4 \qquad 2$$

wherein:
$Z_1$ is a protogenic group;
$E_1$ is an aromatic-containing moiety;
$E_1$ is an aromatic-containing moiety;
$E_2$ is an unsulfonated aromatic-containing and/or aliphatic-containing moiety;
X is an —OH, a halogen, an ester, or

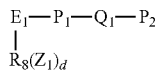

d is the number of $Z_1$ attached to $E_1$;
$P_1$, $P_2$, $P_3$, $P_4$ are each independently: absent, —O—, —S—, —SO—, —CO—, —SO$_2$—, —NR$_1$H—, NR$_2$—, or —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety.

15. The method of claim 12 wherein the block copolymer includes polymer segments 3 and 4:

$$\begin{array}{c} E_1\text{—}P_1\text{—}Q_1\text{—}P_2 \\ | \\ R_8(Z_1)_d \end{array} \qquad 3$$

$$E_2\text{—}P_3\text{—}Q_2\text{—}P_4 \qquad 4$$

wherein:
$Z_1$ is a protogenic group;
$E_1$, $E_2$ are each independently an aromatic-containing and/or aliphatic-containing moiety;
X is an —OH, a halogen, an ester, or

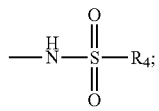

d is the number of $Z_1$ attached to $E_1$;
$P_1$, $P_2$, $P_3$, $P_4$ are each independently: absent, —O—, —S—, —SO—, —CO—, —SO$_2$—, —NH—, NR$_2$—, or —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$R_8(Z_1)_d$ is a moiety having d number of protogenic groups; and
$Q_1$, $Q_2$ are each independently a fluorinated cyclobutyl moiety.

16. The method of claim 12 wherein the block copolymer comprises polymer segments 5 and 6:

$$E_1(SO_2X)_d\text{—}P_1\text{-}Q_1\text{-}P_2 \quad\quad 5$$

$$E_2\text{-}P_3\text{-}Q_2\text{-}P_4 \quad\quad 6$$

connected by a linking group $L_1$ to form polymer units 7 and 8:

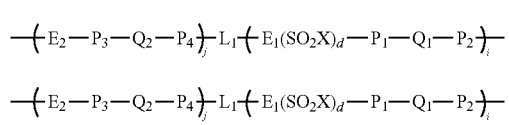

wherein:
$Z_1$ is a protogenic group;
$E_1$ is an aromatic-containing moiety;
$E_2$ is an unsulfonated aromatic-containing and/or aliphatic-containing moiety;
$L_1$ is a linking group;
X is an —OH, a halogen, an ester, or

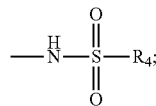

d is a number of $Z_1$ functional groups attached to $E_1$;
$P_1$, $P_2$, $P_3$, $P_4$ are each independently absent, —O—, —S—, —SO—, —SO_2—, —CO—, —NH—, $NR_2$—, —$R_3$—, and
$R_2$ is $C_{1\text{-}25}$ alkyl, $C_{1\text{-}25}$ aryl or $C_{1\text{-}25}$ arylene;
$R_3$ is $C_{1\text{-}25}$ alkylene, $C_{1\text{-}25}$ perfluoroalkylene, or $C_{1\text{-}25}$ arylene;
$R_4$ is trifluoromethyl, $C_{1\text{-}25}$ alkyl, $C_{1\text{-}25}$ perfluoroalkylene, $C_{1\text{-}25}$ aryl, or another $E_1$ group;
$Q_1$, $Q_2$ are each independently a fluorinated cyclobutyl moiety;
i is a number representing repetition of segment 5; and
j is a number representing repetition of polymer segment 6.

17. The method of claim 12 wherein the block copolymer includes polymer segments 9 and 10:

$$E_1(Z_1)_d\text{—}P_1\text{-}Q_1\text{-}P_2 \quad\quad 9$$

$$E_2(Z_1)_f\text{—}P_3 \quad\quad 10$$

wherein:
$Z_1$ is a protogenic group;
$E_1$, $E_2$ is an aromatic or aliphatic-containing moiety wherein at least one of $E_1$ and $E_2$ includes an aromatic substituted with $Z_1$;
X is an —OH, a halogen, an ester, or

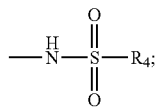

d is the number of ($SO_2X$) functional groups attached to $E_1$,
f is the number of ($SO_2X$) functional groups attached to $E_2$;
$P_1$, $P_2$, $P_3$ are each independently absent, —O—, —S—, —O—, —SO_2—, —CO—, —NH—, $NR_2$—, —$R_3$—, and
$R_2$ is $C_{1\text{-}25}$ alkyl, $C_{1\text{-}25}$ aryl or $C_{1\text{-}25}$ arylene;
$R_3$ is $C_{1\text{-}25}$ alkylene, $C_{1\text{-}25}$ perfluoroalkylene, perfluoroalkyl ether, alkyl ether, or $C_{1\text{-}25}$ arylene;
$R_4$ is trifluoromethyl, $C_{1\text{-}25}$ alkyl, $C_{1\text{-}25}$ perfluoroalkylene, $C_{1\text{-}25}$ aryl, or another $E_1$ group; and
$Q_1$ is a fluorinated cyclobutyl moiety,
with the proviso that when d is greater than zero, f is zero and when f is greater than zero, d is zero.

18. The method of claim 12, wherein said solvent is selected from the group consisting of water, N,N-dimethyl formamide, N,N-dimethyl acetamide, N-methylpyrolidinone, dimethylsulfoxide, fluorinated hydrocarbon, chlorinated hydrocarbon, ketones, tetrahydrofuran, chlorinated aromatics, chlorofluorinated hydrocarbon and mixtures thereof.

19. The method of claim 12, wherein said temperature is at least 80° C. and said voltage is at least 100 V per millimeter of electrode separation.

20. The method of claim 12, wherein after steps a) through g), said film layer is removed from between said electrodes and contacted with boiling water, steam or solvent vapors.

21. The method of claim 12 wherein the distance between said electrodes is about 1 to about 1.5 mm, and said voltage is about 1000 volt.

* * * * *